US011415362B2

(12) United States Patent
Haltmeyer et al.

(10) Patent No.: US 11,415,362 B2
(45) Date of Patent: *Aug. 16, 2022

(54) TRAVELING HARNESS SYSTEM

(71) Applicant: WHIRLPOOL CORPORATION, Benton Harbor, MI (US)

(72) Inventors: Ronald E. Haltmeyer, Swisher, IA (US); Dean A. Martin, Solon, IA (US); Guadalupe Antonio Sanchez, Coralville, IA (US); Jose Paulo Remor, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/069,275

(22) Filed: Oct. 13, 2020

(65) Prior Publication Data

US 2021/0025647 A1 Jan. 28, 2021

Related U.S. Application Data

(63) Continuation of application No. 15/943,042, filed on Apr. 2, 2018, now Pat. No. 10,830,528, which is a continuation of application No. 15/433,786, filed on Feb. 15, 2017, now Pat. No. 9,958,197, which is a continuation of application No. 13/943,827, filed on Jul. 17, 2013, now Pat. No. 9,585,474.

(51) Int. Cl.
| | |
|---|---|
| *F25D 23/04* | (2006.01) |
| *F25D 23/06* | (2006.01) |
| *A47B 88/443* | (2017.01) |
| *F25D 25/02* | (2006.01) |
| *A47B 88/49* | (2017.01) |
| *A47B 97/00* | (2006.01) |
| *F16L 3/01* | (2006.01) |

(52) U.S. Cl.
CPC .......... *F25D 23/067* (2013.01); *A47B 88/443* (2017.01); *A47B 88/49* (2017.01); *A47B 97/00* (2013.01); *F16L 3/01* (2013.01); *F25D 25/025* (2013.01); *A47B 2097/003* (2013.01); *A47B 2210/175* (2013.01); *F25D 2400/36* (2013.01); *F25D 2400/40* (2013.01); *Y10T 29/49195* (2015.01)

(58) Field of Classification Search
CPC ....... A47B 88/49; A47B 88/443; A47B 97/00; F25D 23/067; F25D 25/025; F16L 3/01
USPC ........ 312/330.1, 401, 402, 404, 405; 62/382
See application file for complete search history.

(56) References Cited

U.S. PATENT DOCUMENTS

| | | |
|---|---|---|
| 2,786,094 A | 3/1957 | Morton |
| 3,792,189 A | 2/1974 | Stengel et al. |
| (Continued) | | |

FOREIGN PATENT DOCUMENTS

| | | |
|---|---|---|
| JP | 2004250345 A | 9/2004 |
| KR | 100628061 B1 | 9/2006 |
| WO | 2009115277 | 9/2009 |

*Primary Examiner* — James O Hansen
(74) *Attorney, Agent, or Firm* — Nyemaster Goode, P.C.

(57) ABSTRACT

A traveling harness system is provided for an appliance to maintain electrical connections between the appliance and a drawer, while allowing the drawer to move. Wiring harness guides formed in the drawer force the wiring harness to maintain a predictable and desirable loop radius to reduce stress on the wiring harness, which prevents the wiring harness from prematurely wearing.

18 Claims, 7 Drawing Sheets

(56) References Cited

U.S. PATENT DOCUMENTS

| | | | |
|---|---|---|---|
| 5,344,046 | A | 9/1994 | Maldanis et al. |
| 5,406,441 | A | 4/1995 | Warda et al. |
| 6,098,411 | A | 8/2000 | Jeon |
| 6,327,139 | B1 | 12/2001 | Champion et al. |
| 6,730,850 | B2 | 5/2004 | Tsutsumi et al. |
| 7,082,720 | B2 | 8/2006 | Kobayashi et al. |
| 7,097,047 | B2 | 8/2006 | Lee et al. |
| 7,197,888 | B2 | 4/2007 | LeClear et al. |
| 7,729,132 | B2 | 6/2010 | Yamamoto et al. |
| 7,784,888 | B2 | 8/2010 | Oh et al. |
| 8,169,794 | B2 | 5/2012 | Matsukawa et al. |
| 8,291,816 | B2 | 10/2012 | Iwamoto et al. |
| 2002/0005014 | A1* | 1/2002 | Doshita ................ B60R 16/027 49/360 |
| 2002/0171335 | A1 | 11/2002 | Held |
| 2004/0120681 | A1 | 6/2004 | Bohle et al. |
| 2006/0030174 | A1* | 2/2006 | Tsubaki ................ H02G 11/00 439/76.2 |
| 2006/0087208 | A1 | 4/2006 | Oh et al. |
| 2006/0097611 | A1 | 5/2006 | Kim et al. |
| 2006/0144058 | A1 | 7/2006 | Kentner et al. |
| 2007/0274042 | A1 | 11/2007 | Jackson et al. |
| 2009/0099706 | A1 | 4/2009 | Wenzel et al. |
| 2010/0054687 | A1 | 3/2010 | Li et al. |
| 2011/0005264 | A1 | 1/2011 | Lee et al. |
| 2011/0050065 | A1 | 3/2011 | Lee et al. |
| 2011/0146333 | A1 | 6/2011 | Koo et al. |
| 2011/0181163 | A1 | 7/2011 | Han et al. |

\* cited by examiner

TRAVELING HARNESS SYSTEM

CROSS REFERENCE TO RELATED APPLICATIONS

This application is a continuation of U.S. patent application Ser. No. 15/943,042, filed on Apr. 2, 2018, entitled "TRAVELING HARNESS SYSTEM", now U.S. Pat. No. 10,830,528, which is a continuation of U.S. patent application Ser. No. 15/433,786, filed Feb. 15, 2017, entitled "TRAVELING HARNESS SYSTEM," now U.S. Pat. No. 9,958,197, which is a continuation of U.S. patent application Ser. No. 13/943,827, filed Jul. 17, 2013, entitled "TRAVELING HARNESS SYSTEM," issued as U.S. Pat. No. 9,585,474, which are hereby incorporated by reference in their entireties.

FIELD

This disclosure relates to appliances. In particular, this disclosure is drawn to refrigerators and/or freezers having drawers with integrated user interfaces.

BACKGROUND

Appliances, such as refrigerators, sometimes include drawer type doors, or drawers disposed within the appliance. If an appliance drawer includes electrical devices, such as lights, displays, controls, etc., it is desirable to route power and signals to the electrical devices. Typically, power and signals are delivered using wiring harnesses or cable assemblies. Since a drawer, and any associated wiring harnesses, will be frequently opened and closed, the wiring harnesses tend to wear due to the harness flexing and rubbing on other objects.

SUMMARY

An appliance is provided including a cabinet, a drawer movable between an open position and a closed position, a wiring harness between the drawer and a wall of the cabinet, a first wiring harness guide coupled to the drawer, the first wiring harness guide being configured to orient the wiring harness at a desired angle, relative to the drawer, and a second wiring harness guide coupled to the cabinet to guide the wiring harness to a desired geometry when the drawer is moved.

Another embodiment provides an appliance including a cabinet, a drawer movable between an open position and a closed position, a conduit coupled to the drawer and extending generally parallel to a wall of the cabinet, a cable assembly coupled to the cabinet and to the drawer, the cable assembly being routed at least partially through the conduit, and a cable assembly guide coupled to the drawer and disposed proximate an end of the conduit, the cable assembly guide being configured to orient the wiring harness away from the wall of the cabinet.

Another embodiment provides a method of delivering power and signals to a drawer of an appliance including coupling a first end of a cable assembly to a wall of the appliance, coupling a second end of the cable assembly to the drawer such that a length of the cable assembly extends between the drawer and the wall, and coupling a cable assembly guide to the drawer to control the orientation of the cable assembly extending between the drawer and the wall, wherein the cable assembly guide orients the cable assembly away from the wall in the proximity of the cable assembly guide.

Other features and advantages of the present disclosure will be apparent from the accompanying drawings and from the detailed description that follows below.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Generally, the present disclosure relates to a traveling harness system for appliances such as refrigerators and freezers. A traveling harness is used to provide signals and/or power to a user interface integrated with a drawer in an appliance. For example, some refrigerators include a freezer drawer or food storage drawers that include a user interface (e.g., indicators, displays, controls, etc.). A wiring harness is coupled between the refrigerator cabinet harness and the drawer user interface to provide signals and/or power to the user interface. When the drawer is opened and closed, the wiring harness bends to maintain the electrical connections between the refrigerator and drawer, while allowing the drawer to move. To increase the reliability of the refrigerator, wiring harness guides force the wiring harness to maintain a predictable and desirable loop radius to reduce stress on the harness, which prevents the wiring harness from prematurely wearing. In one example, the wiring harness guide is coupled to the drawer at the point where the wiring harness is coupled to the drawer, and forces the wiring harness to extend away from the refrigerator wall, at a specific angle. In another example, a second wiring harness guide is coupled to the refrigerator wall to guide the opposite end of the wiring harness to a desired radius. By keeping the wiring harness at an optimal radius, stresses on the wiring harness are minimized when the drawer is opened and closed.

The following disclosure will be described in the context of wiring harnesses in appliances such as refrigerators and freezers. It shall be understood that the concepts described also apply to other appliances, furniture, and other applications.

Figure 1:
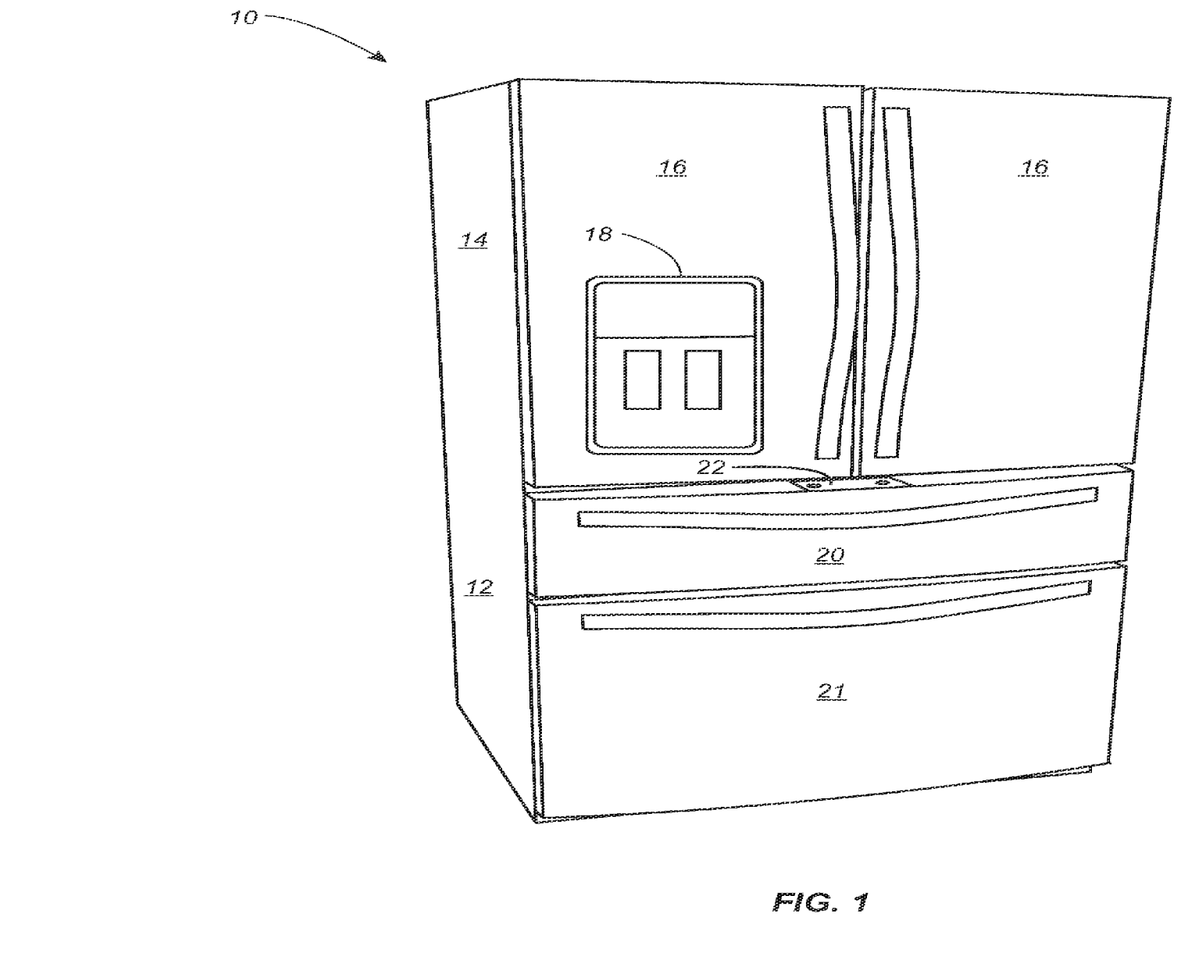
FIG. 1 is an isometric view of a refrigerator having a drawer with a traveling harness.

FIG. 1 is an isometric view of a refrigerator 10 that may be used with a traveling harness of the present disclosure. In the example of FIG. 1, the refrigerator 10 has a lower freezer compartment (pantry 12) and an upper fresh food compartment 14. Other configurations are also possible. The fresh food compartment 14 includes side-by-side doors 16 and a water and ice dispenser 18. The pantry 12 includes an upper door 20 and a lower door 21. The pantry 12 and doors 20 and 21 form a drawer type freezer compartment. The upper door 20 includes a user interface 22 disposed on the upper edge of the door 20. The user interface 22 may include an LCD display, LED indicators, buttons, etc. The user interface could also be disposed on the front surface of the door 20. One or more lights (not shown) may be used to illuminate the contents of the pantry 12.

Figure 2:
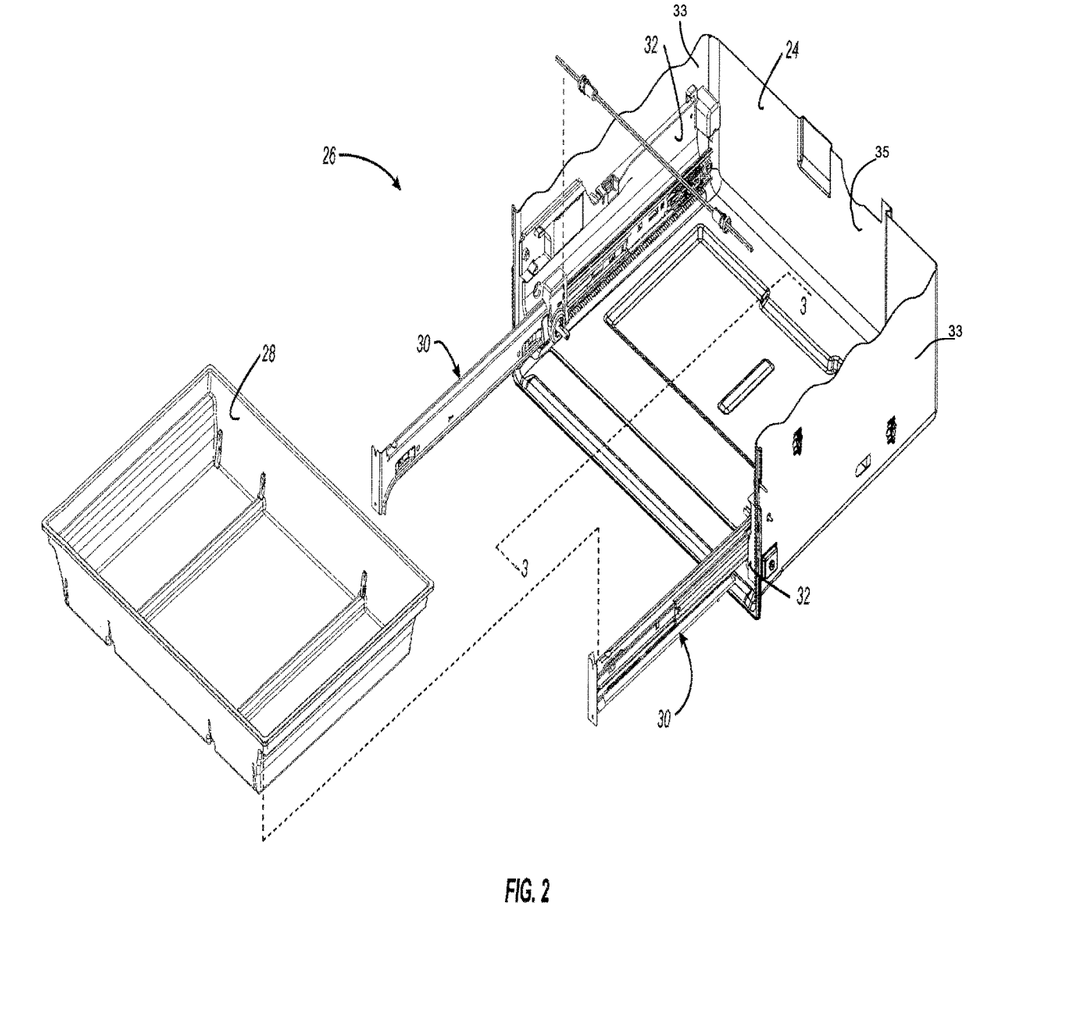
FIG. 2 is an exploded partial isometric view of a drawer of a refrigerator.

The configuration of the pantry 12 and doors 20 and 21 may take on any desired form. FIGS. 2-9 illustrate one example of a drawer-style pantry 12. In the example shown in FIGS. 2-9, the refrigerator 10 includes a liner 24 along the cabinet rear wall 35 and side walls 33 that lines the interior surfaces of the refrigerator 10 and forms interior walls of the refrigerator 10. FIG. 2 is an exploded view of a drawer 26 that is part of the pantry 12. The drawer 26 includes a tray 28 that is used to hold food that is stored in the pantry 12. For clarity, door 20 is not shown. The tray 28 is mounted to a pair of opposing rails 30 that are movably coupled to left and right pantry adapters 32, which are mounted to the liner 24 of the refrigerator 10. The rails 30 allow the tray 28 to slide out when a user pulls the handle of the pantry door 20. The example of FIG. 2 shows various details of the liner 24, rails 30, and tray 28 that are not essential to the disclosure described below.

Figure 3:
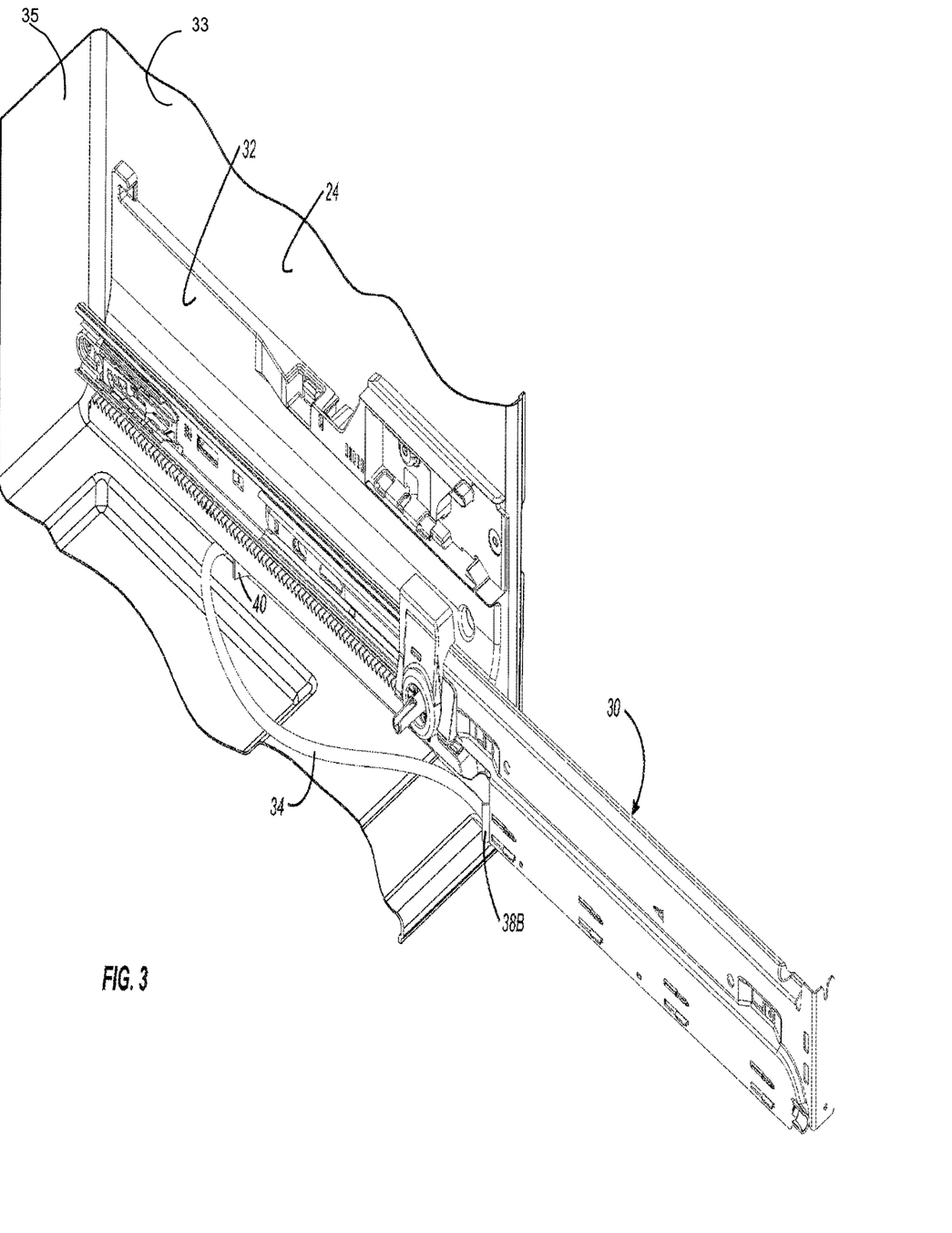
FIG. 3 is an enlarged partial isometric view taken from the perspective of line 3-3 of FIG. 2
Figure 4:
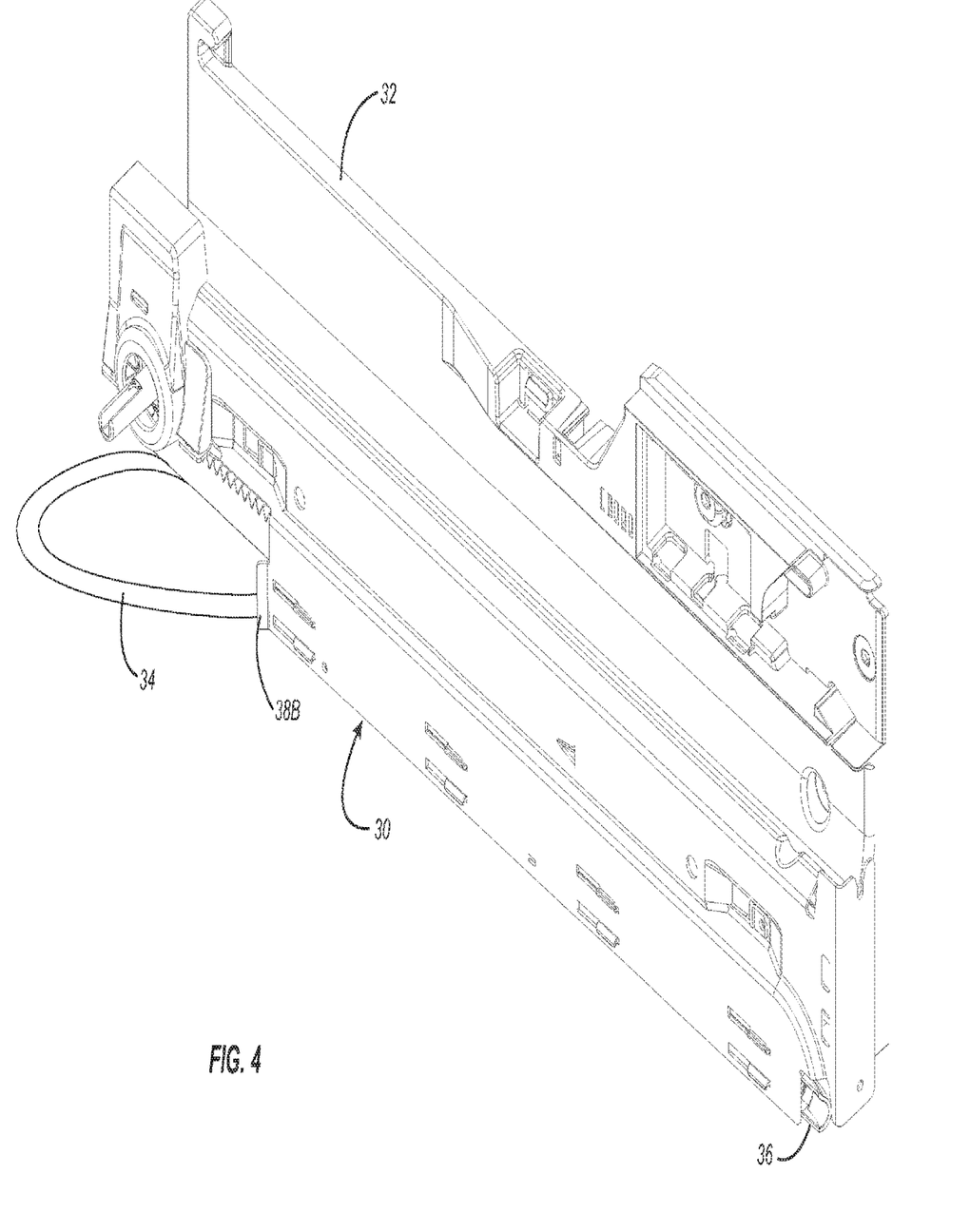
FIG. 4 is an isometric view of a pantry adapter and rail in the closed position.

In the example shown in FIGS. 2-9, the user interface 22 of the pantry door 20 is electrically coupled to the refrigerator 10 via a wiring harness, or cable assembly. In the examples shown, the wiring harness is disposed on the right side of the drawer 26, and is not shown in FIG. 2. FIGS. 3 and 4 are isometric view of the right hand rail 30 shown in FIG. 2, viewed from the opposite side of FIG. 2. FIG. 3 shows a partial view of the liner 24, pantry adapter 32, and rail 30 taken from the perspective of line 3-3 of FIG. 2. The tray 28 and pantry door 20 are not shown. In FIG. 3, the rail 30 is in the open position. FIG. 3 also shows a wiring harness 34 that is coupled to the rail 30 and the pantry adapter 32. The wiring harness 34 provides an electrical connection (for signals and/or power) between the refrigerator 10 and the user interface 22 of the pantry door 20. If desired, a user can unplug the wiring harness 34 in order to remove the drawer 26.

FIG. 4 shows the pantry adapter 32 and rail 30 in the closed position. The liner 24 is not shown in FIG. 4. As with FIG. 3, the wiring harness 34 is coupled to the rail 30 and the pantry adapter 32. As shown in FIGS. 3 and 4, the wiring harness 34 moves from an extended orientation (FIG. 3) when the drawer is in the open position to a coiled position (FIG. 4) when the drawer is in the closed position. As described in detail below, the orientation of the wiring harness 34 is controlled to minimize wear on the wiring harness 34. As shown in FIGS. 3 and 4, the wiring harness 34 is oriented in a horizontal plane in both the open and closed positions.

Figure 5:
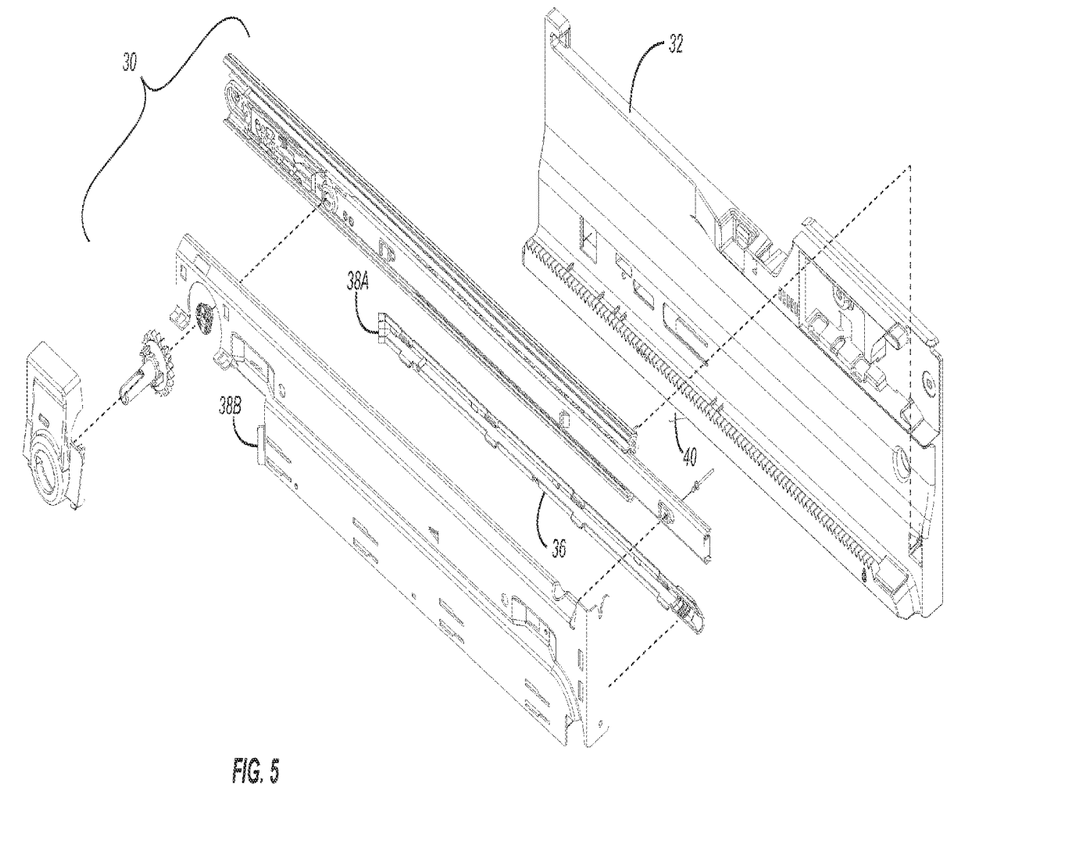
FIG. 5 is an exploded isometric view of the pantry adapter and rail shown in FIG. 4.

FIG. 5 is an exploded isometric view of the pantry adapter 32 and rail 30 shown in FIG. 4 (in the closed position). The rail 30 has a conduit 36 that secures the wiring harness 34 to the rail 30 along most of the length of the rail 30. At the rear end (the end toward the back of the refrigerator 10) of the conduit 36, the conduit 36 is angled outward (relative to the liner 24 and refrigerator wall) to form a part of a wiring harness guide 38 (shown as wiring harness guide 38A). An angled portion 38B of the rail 30 forms the remaining part of the wiring harness guide 38. The wiring harness guide 38 forces the wiring harness 34 to be oriented at a desired angle, relative to the rail 30, to maintain a specific, desired loop radius.

Figure 6:
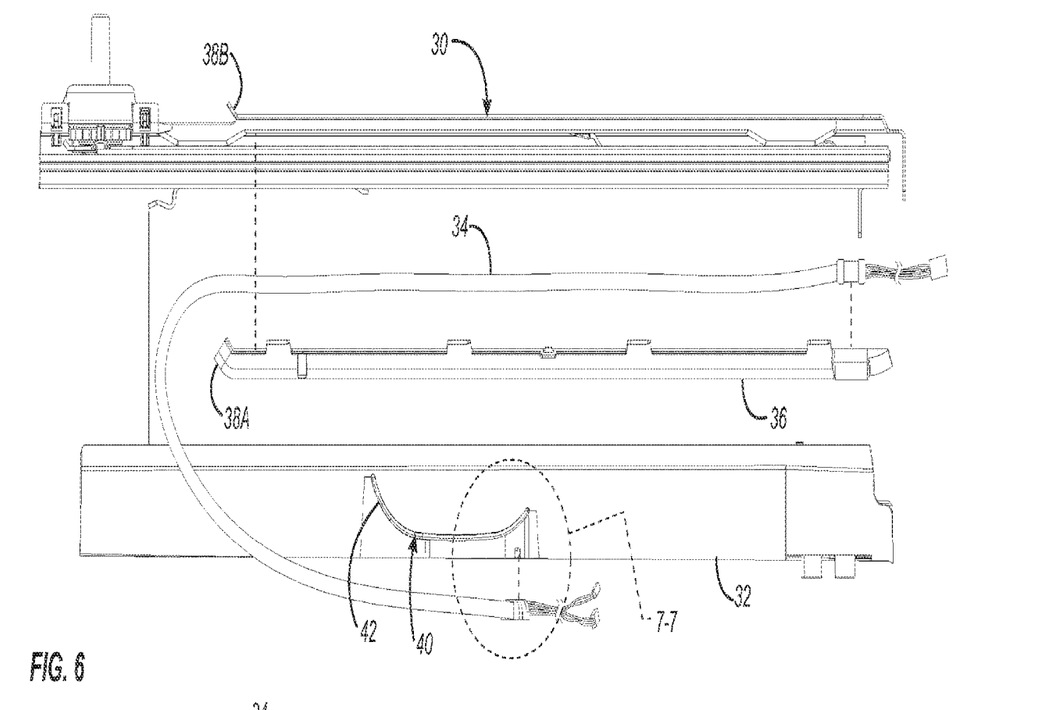
FIG. 6 is an exploded bottom view of a pantry adapter, rail, conduit, and wiring harness.

FIG. 6 is an exploded bottom view of the pantry adapter 32, rail 30, conduit 36, and wiring harness 34. As shown, the wiring harness guide 38 (formed by 38A and 38B) is angled outward, relative to the pantry adapter 32 (and thus, the wall of the refrigerator 10) to guide the orientation of the wiring harness 34. FIG. 6 also shows a second wiring harness guide 40 that is formed on the pantry adapter 32. The wiring harness guide 40 has a curved surface 42 that has a guide geometry that helps keep the wiring harness 34 within a specific desired loop radius.

Figure 7:
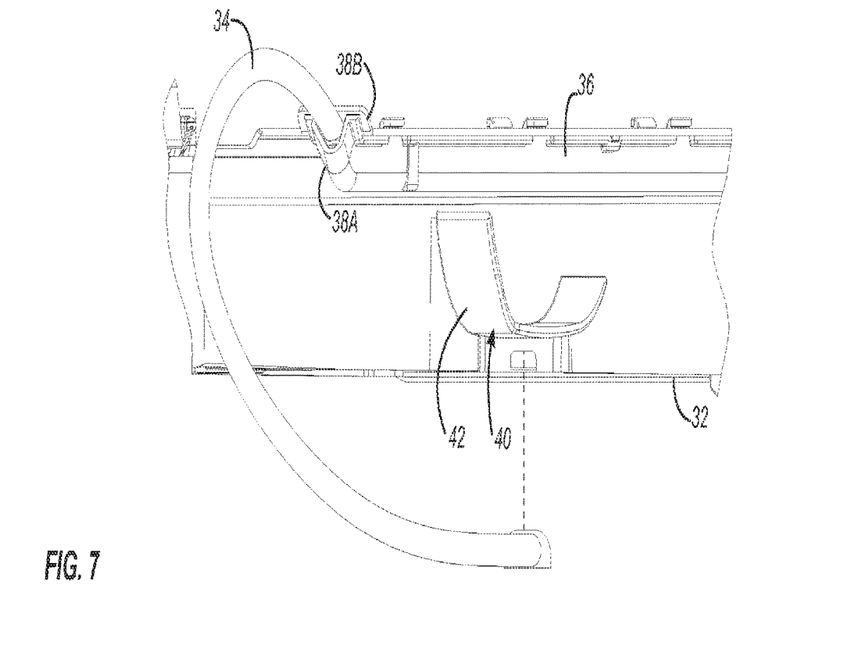
FIG. 7 is an enlarged partial view taken along lines 7-7 of FIG. 6.

FIG. 7 is an enlarged partial view taken along lines 7-7 of FIG. 6. The view of FIG. 7 is taken at a slight angle from the rear of the refrigerator to help illustrate the orientation of the wiring harness guides 38 and 40.

Figure 8:
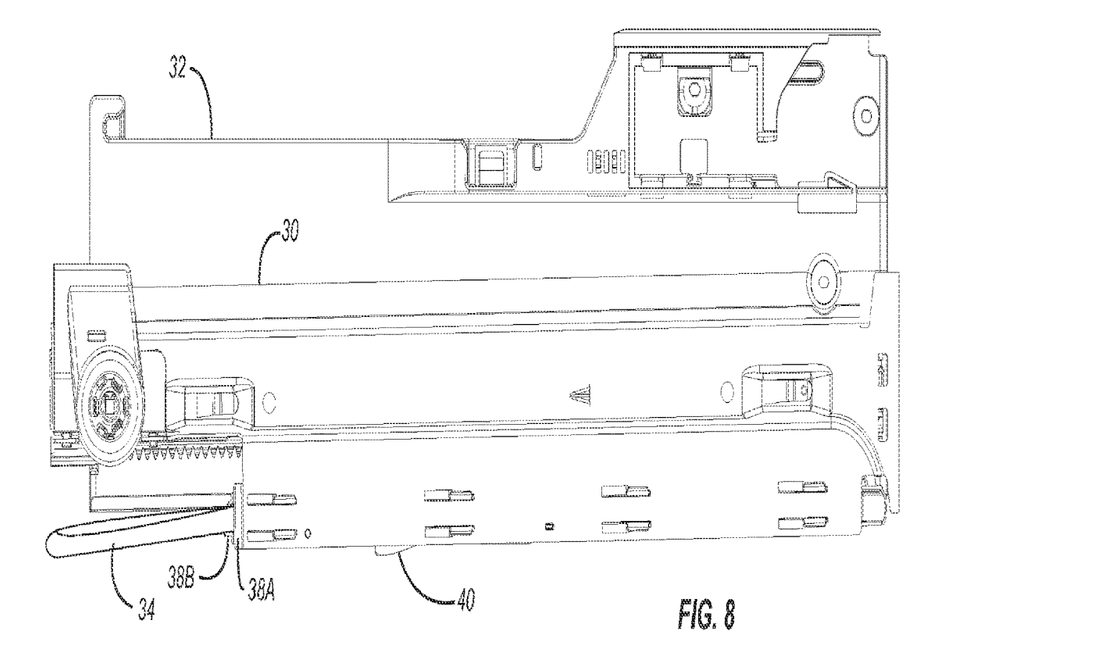
FIG. 8 is a side view of the pantry adapter, rail, and wiring harness from the perspective of the interior of the drawer.
Figure 9:
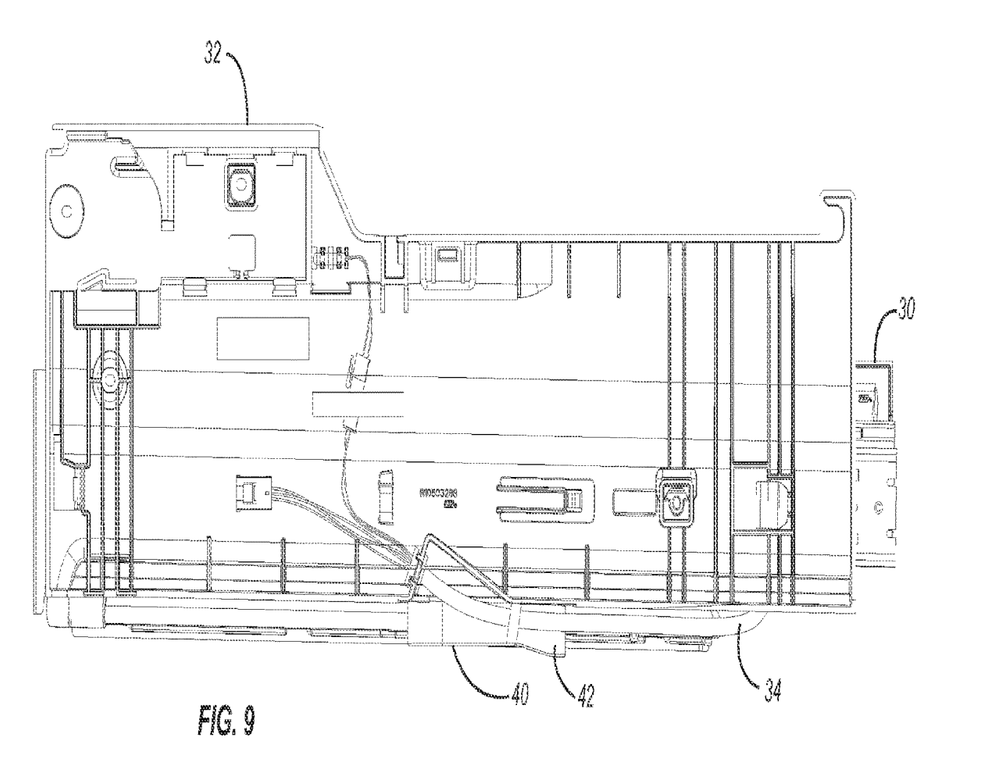
FIG. 9 is a side view of the pantry adapter, rail, and wiring harness from the perspective of the exterior of the drawer.

FIGS. 8 and 9 are side views of the pantry adapter 32, rail 30, and wiring harness 34 shown in FIG. 4 (the closed position). FIG. 8 is a side view of the pantry adapter 32, rail 30, and wiring harness 34 from the perspective of the interior of the drawer 26. As shown, the wiring harness 34 extends from the rail 30 (guided by the wiring harness guide 38), forming a loop, and is coupled at the opposite end to the pantry adapter 32. FIG. 9 is an opposite side view of the pantry adapter 32, rail 30, and wiring harness 34 from the perspective of the exterior of the drawer 26. As shown, the wiring harness 34 is coupled to the pantry adapter 32 (i.e., at the side of the refrigerator) and is guided by the wiring harness guide 40. The combination of the wiring harness guides 38 and 40 cause the wiring harness 34 to maintain a specific, desired loop radius during the operation of the pantry drawer to minimize stress on the wiring harness 34, increasing the lifespan of the wiring harness 34.

In the preceding detailed description, the disclosure is described with reference to specific exemplary embodiments thereof. Various modifications and changes may be made thereto without departing from the broader spirit and scope of the disclosure as set forth in the claims. The specification and drawings are, accordingly, to be regarded in an illustrative rather than a restrictive sense.

What is claimed is:

1. An appliance comprising:
   a cabinet having a back wall and a side wall having an interior facing side; and
   a drawer having a user interface electrically coupled to the appliance via a wiring harness and movable between an open position and a closed position;
   wherein the wiring harness is disposed in a rail having a length positioned between the drawer and the cabinet and wherein the wiring harness is secured to the rail along a majority of the length of the rail wherein the rail has a rear end and a first wiring harness guide proximate the rear end of the rail and extending toward the drawer at an angle proximate the rear end and wherein the wiring harness is located between the drawer and the side wall of the cabinet;
   a second wiring harness guide having a curved surface;
   wherein the wiring harness at least partially extends along the curved surface of the second wiring harness guide and an angled end of the first wiring harness guide; and
   wherein first wiring harness guide extends from a conduit at a rear end of the conduit and orients the wiring harness away from the side wall of the cabinet and causes the wiring harness to form a loop portion that is loop-shaped proximate the back wall of the cabinet and extending outside the rail when the drawer is in the closed position.

2. The appliance of claim 1, wherein the wiring harness is secured to the rail along a majority of the length of the rail by a conduit engaged with the rail.

3. The appliance of claim 1 further comprising a pantry adapter configured to receive the drawer and positioned between the rail and an interior facing surface of the side wall of the cabinet.

4. The appliance of claim 1, wherein the first wiring harness guide is formed by an angled end of a conduit and an angled portion of the rail.

5. The appliance of claim 4, wherein the wiring harness extends from a rear end of the conduit forming a loop portion that is loop-shaped when the drawer is in the closed position and the loop portion of the wiring harness is oriented in a substantially horizontal plane.

6. The appliance of claim 1, wherein the wiring harness is coupled to the side wall of the cabinet via a pantry adapter and wherein the first wiring harness guide includes an angled end that is angled away from the side wall of the cabinet at approximately 45 degrees.

7. The appliance of claim 1, wherein the wiring harness is configured to be unplugged and the drawer is configured to be removable from the appliance when the wiring harness is unplugged.

8. The appliance of claim 1, wherein the user interface is electrically connected to the wiring harness and wherein the wiring harness extends through a rear end of a conduit that faces the back wall of the cabinet.

9. The appliance of claim 2, wherein an angled end of the conduit and an angled portion of the rail cooperate together to form the first wiring harness guide.

10. A refrigerator comprising:
    a cabinet having a rear wall and a side wall having an interior facing side;
    a drawer having a slidable rail attached to the side wall and the drawer, the drawer movable between an open position and a closed position and having a user interface;
    a wiring harness configured to electrically couple the user interface and the refrigerator, the wiring harness disposed between the user interface and the side wall, the wiring harness having a length and a loopable portion, wherein the wiring harness is secured to the rail along a majority of the length;
    a first wiring harness guide disposed proximate the rear wall and configured to:
        keep the loopable portion proximate the rear wall when the drawer is in the closed position; and
        keep the loopable portion within a loop radius when the drawer is moved;
    wherein the first wiring harness guide extends from the rail proximate the rear of the refrigerator and orients the wiring harness outside the slidable rail away from the side wall of the cabinet and is configured to cause the wiring harness to form a loop portion that is loop-shaped proximate the rear wall of the cabinet when the drawer is in the closed position.

11. The refrigerator of claim 10, wherein the first wiring harness guide is a curved wire harness guide.

12. The refrigerator of claim 10, wherein the rail has a length and further comprises having a conduit associated therewith and the wiring harness is secured to the rail along a majority of the length of the rail and positioned within the conduit.

13. The refrigerator of claim 12, wherein the wiring harness at least partially extends along a curved surface of the first wiring harness guide and an angled portion of the first wiring harness guide.

14. The refrigerator of claim 10, wherein an angled end of a conduit and an angled portion of the rail cooperate together to form the first wiring harness guide.

15. The refrigerator of claim 10, wherein the drawer is mounted to a liner of the side wall of the cabinet.

16. A movable storage compartment with constant electrical connection comprising:
    a slidable rail configured to attach to a side wall of a refrigerator, the movable storage compartment movable between an open position and a closed position and having a user interface;
    a wiring harness electrically connected to the user interface and configured to electrically connect to the side wall, the wiring harness disposed in the slideable rail and having a length and a loopable portion;
    a rail wiring harness guide having a curved surface and disposed proximate a rear end of the rail and extending toward a moveable storage compartment at an angle;
    wherein the wiring harness extends beyond the rail wiring harness guide proximate a rear end of the rail;
    wherein the wiring harness at least partially extends along the curved surface of the rail wiring harness guide; and
    wherein the rail wiring harness guide keeps the wiring harness loopable portion within a loop radius when the moveable storage compartment is moved and the loopable portion is a loop shape having a portion extending outside the rail in a direction opposite the side wall and proximate a back wall of the refrigerator when the moveable storage compartment is in the closed position.

17. The refrigerator of claim 16, wherein the slideable rail includes a wire harness receiving conduit and the user interface is electrically connected to the wiring harness and wherein the wiring harness extends through a rear end of the wire harness receiving conduit.

18. The refrigerator of claim 17, wherein an angled end of the wire harness receiving conduit and an angled portion of the rail cooperate together to form the rail wiring harness guide.

* * * * *